(12) United States Patent
Hurd (10) Patent No.: US 10,273,131 B2
(45) Date of Patent: *Apr. 30, 2019

(54) PORTABLE AND FOLDABLE LIFT

(71) Applicant: Brent Hurd, Geneva, FL (US)

(72) Inventor: Brent Hurd, Geneva, FL (US)

( * ) Notice: Subject to any disclaimer, the term of this patent is extended or adjusted under 35 U.S.C. 154(b) by 352 days.

This patent is subject to a terminal disclaimer.

(21) Appl. No.: 14/642,520

(22) Filed: Mar. 9, 2015

(65) Prior Publication Data

US 2015/0175395 A1 Jun. 25, 2015

Related U.S. Application Data

(63) Continuation of application No. 14/101,327, filed on Dec. 9, 2013, now Pat. No. 8,973,898.

(60) Provisional application No. 61/785,191, filed on Mar. 14, 2013.

(51) Int. Cl.

| *B62B 3/06* | (2006.01) |
|---|---|
| *B66F 7/10* | (2006.01) |
| *A47B 97/00* | (2006.01) |
| *B60P 1/44* | (2006.01) |
| *B66F 3/02* | (2006.01) |
| *B66F 3/42* | (2006.01) |
| *B66F 3/44* | (2006.01) |
| *B66F 7/06* | (2006.01) |
| *B66F 3/00* | (2006.01) |
| *B66F 7/00* | (2006.01) |
| *B25H 1/00* | (2006.01) |

(52) U.S. Cl.
CPC .............. *B66F 7/10* (2013.01); *A47B 97/00* (2013.01); *B25H 1/00* (2013.01); *B60P 1/4421* (2013.01); *B60P 1/4442* (2013.01); *B66F 3/00* (2013.01); *B66F 3/02* (2013.01); *B66F 3/42* (2013.01); *B66F 3/44* (2013.01); *B66F 7/00* (2013.01); *B66F 7/06* (2013.01); *B66F 7/0633* (2013.01); *B66F 7/0641* (2013.01)

(58) Field of Classification Search
USPC .......... 254/2 R, 2 C, 6 R; 414/462, 539, 545
See application file for complete search history.

(56) References Cited

U.S. PATENT DOCUMENTS

| 3,180,503 | A | | 4/1965 | Shaw | |
|---|---|---|---|---|---|
| 3,887,092 | A | | 6/1975 | Leet | |
| 3,896,904 | A | | 7/1975 | Walker | |
| 4,252,492 | A | | 2/1981 | Scothern | |
| 5,234,310 | A | * | 8/1993 | Driver | 414/540 |
| 5,419,672 | A | | 5/1995 | Poe | |
| 5,967,734 | A | | 10/1999 | Liu | |
| 6,435,804 | B1 | * | 8/2002 | Hutchins | B60P 1/4414 187/200 |
| 6,799,935 | B1 | | 10/2004 | Grollitsch | |
| 6,893,203 | B2 | | 5/2005 | Anderson et al. | |
| 7,806,647 | B2 | | 10/2010 | Gomes et al. | |

(Continued)

*Primary Examiner* — Joseph J Hail
*Assistant Examiner* — Shantese McDonald
(74) *Attorney, Agent, or Firm* — Michael L. Leetzow, P.A.

(57) ABSTRACT

A portable and foldable lift can be attached to a surface such as a tailgate of a truck. The lift can be slid off the gate and used to lift heavy objects from the ground to the bed of the truck. The portable and foldable lift is returned in a folded position to the tailgate for easy storage. The portable and foldable lift can also be attached to a work bench, either on top or underneath, and can be folded up and stored out of the way.

18 Claims, 11 Drawing Sheets

(56) References Cited

U.S. PATENT DOCUMENTS

| | | | | |
|---|---|---|---|---|
| 2005/0002769 | A1* | 1/2005 | Scheibel | B60P 1/4428 414/540 |
| 2007/0065262 | A1* | 3/2007 | Murphy | B60P 1/4471 414/462 |
| 2011/0176898 | A1* | 7/2011 | Bird, III | B65D 90/18 414/540 |
| 2013/0146824 | A1* | 6/2013 | Drake | B66F 7/12 254/92 |

* cited by examiner

PORTABLE AND FOLDABLE LIFT

REFERENCE TO RELATED CASE

This application is a continuation of U.S. Pat. No. 8,973,898, issued on Mar. 10, 2015, which in turn claims priority under 35 U.S.C. § 119 (e) to provisional application No. 61/785,191, filed on Mar. 14, 2013, the content of both applications are hereby incorporated by reference in their entirety.

BACKGROUND OF THE INVENTION

Field of the Invention

The present invention relates to a portable and foldable lift that can be stored away when it is not in use.

The portable and foldable lift that is attachable to a structure, such as the tailgate of a truck, the upper or underside of a workbench, a van door, or any other appropriate structure. The portable and foldable lift allows a single person (or a slight person) to move and lift heavy objects onto a raised surface.

Thus, the present invention allows one person to move heavy objects into the bed of a truck, onto a workbench, into the interior of a van, etc.

SUMMARY OF THE INVENTION

The present invention is directed to a portable and foldable lift that is attachable to a structure, the portable lift that includes a support member, the support member extending between a top end and a bottom end, a lifting member, a support plate, the support plate operatively connected to the lifting member, the lifting member moving the support plate relative to the support member, and a glide member operatively connected to the support member adjacent the top end thereof and slidably connected to a generally flat surface by an attachment member.

In some embodiments, the support plate is removably attached to the lifting member.

In some embodiments, the support member has a base attached to the bottom end there of.

In some embodiments, the glide member is rotatably and slidably connected to the attachment member.

In yet another aspect, the present invention is directed to a portable and foldable lift that is attachable to a structure, the portable lift includes a support member, the support member extending between a top end and a bottom end, a lifting member, a support plate, the support plate operatively connected to the lifting member, the lifting member moving the support plate relative to the support member, a glide member operatively connected to the support member adjacent the top end thereof and slidably connected to a generally flat surface by an attachment member, a base attached to the support member at the bottom end thereof, and a height adjustment member is attached to the support member to adjust the height of the support member relative to the generally flat surface.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description of the present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

Reference will now be made in detail to the present preferred embodiment(s) of the invention, examples of which are illustrated in the accompanying drawings. Whenever possible, the same reference numerals will be used throughout the drawings to refer to the same or like parts.

Figure 3:
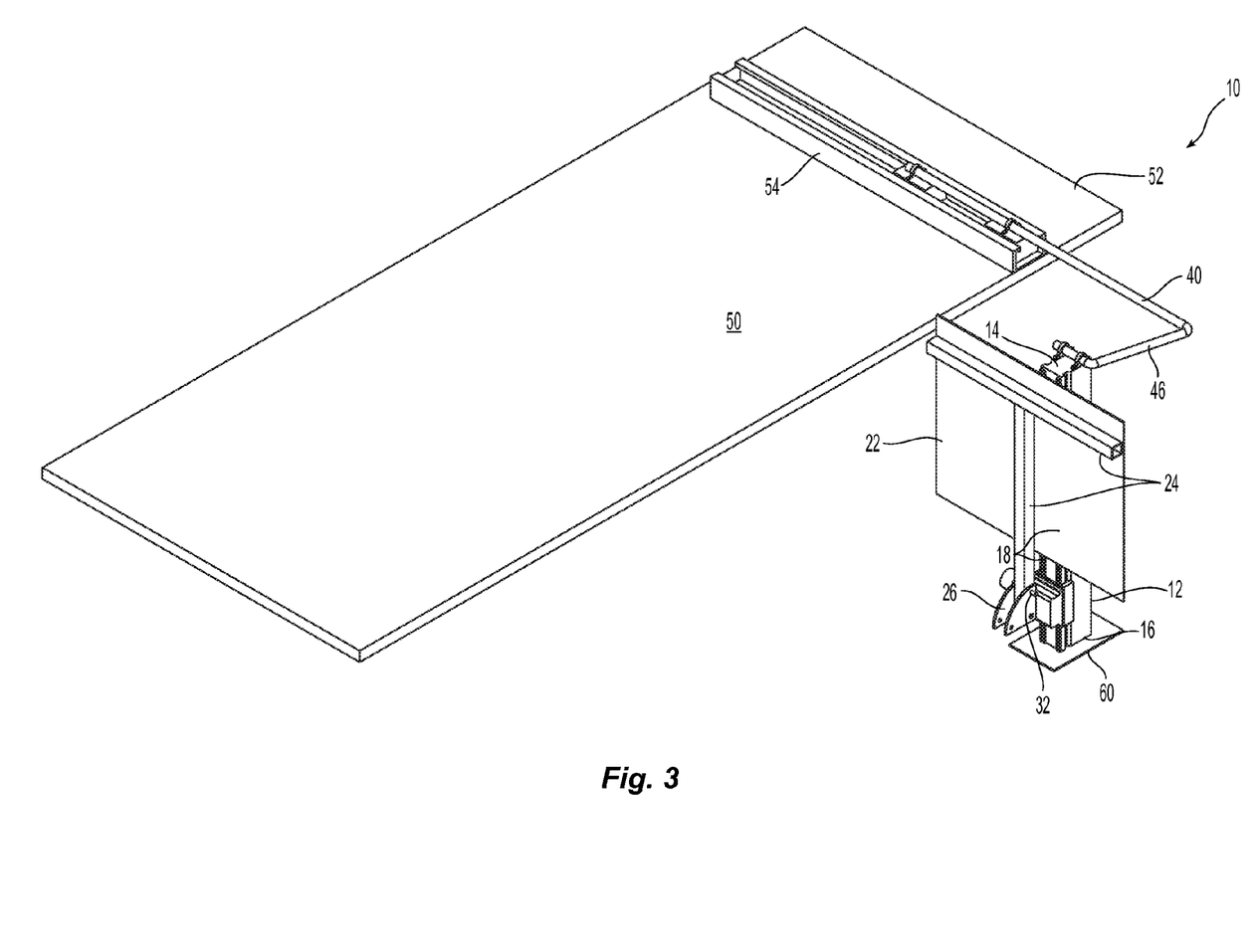
FIG. 3 is a perspective view of the portable and foldable lift of FIG. 1 in a folded position ready for storage.

FIGS. 1-5 show a first embodiment of a portable and foldable lift 10 according to the present invention. The portable and foldable lift 10 has a support member 12 with a top end 14 and a bottom end 16. The support member 12 is preferably made from a hard, light material, such as aluminum, but could be made of any appropriate material, including, for example, stainless steel, steel, structural plastics (e.g., polyethylene), carbon fiber, and titanium. Aluminum, being less dense than steel, is better suited to the purposes of the invention. On one side of the support member 12 are teeth 18, which are used by the lifting member 20, as discussed in more detail below. While the figures illustrate two rows of teeth 18 on either side of the support member 12, there may be only one row, one central row of teeth, or the entire side of the support member 12 may have the teeth 18. Alternatively, the teeth 18 may be on multiple sides, depending on the lifting member 20 used with portable and foldable lift 10. The lifting member 20 in this embodiment is an electric motor operatively connected to two gears, the gears having teeth that complement the teeth 18 on the support member 12. Attached to the lifting member 20 is a support plate 22, which has sufficient rigidity to support the objects placed thereon. The support plate 22 can be made out of any appropriate materials, including, for example, aluminum, stainless steel, steel, structural plastics (e.g., polyethylene), carbon fiber, and titanium. The size of the support plate 22 may be of any size, limited only by the user's ability to store the support plate 22 or the weight thereof relative to the lifting member 20. The support plate 22 also has a support rib 24 that may be connected to and extend from the lifting member 20 or simply be used to provide support to the support plate 22. See also FIG. 3. Alternatively, the support plate 22 may be of a sufficient strength and of a sufficient thickness to attach directly to the lifting member 20 without the need for the support rib 24. The support rib 24 may also be larger or smaller relative to the support plate 22 as illustrated in the figures and still fall within the scope of the present invention. The lifting member 20 is connected to the support plate 22 and/or support rib 24 by way of a connector 26. The connector 26 allows the support plate 22 and/or support rib 24 to be rotatably attached to the lifting member 20. As illustrated in FIG. 3, the support plate 22 and support rib 24 are rotated up 90 degrees relative to the lifting member 20 and the support member 12 from the position shown in FIG. 1. The support rib 24 is illustrated as being connected to connector 26 about a pin 28 and then held in a horizontal position with the removable pin 30. A second removable pin 32 is disposed at the top of the connector 26 to secure the support plate 22 and support rib 24 in the vertical position illustrated in FIG. 3.

Figure 1:
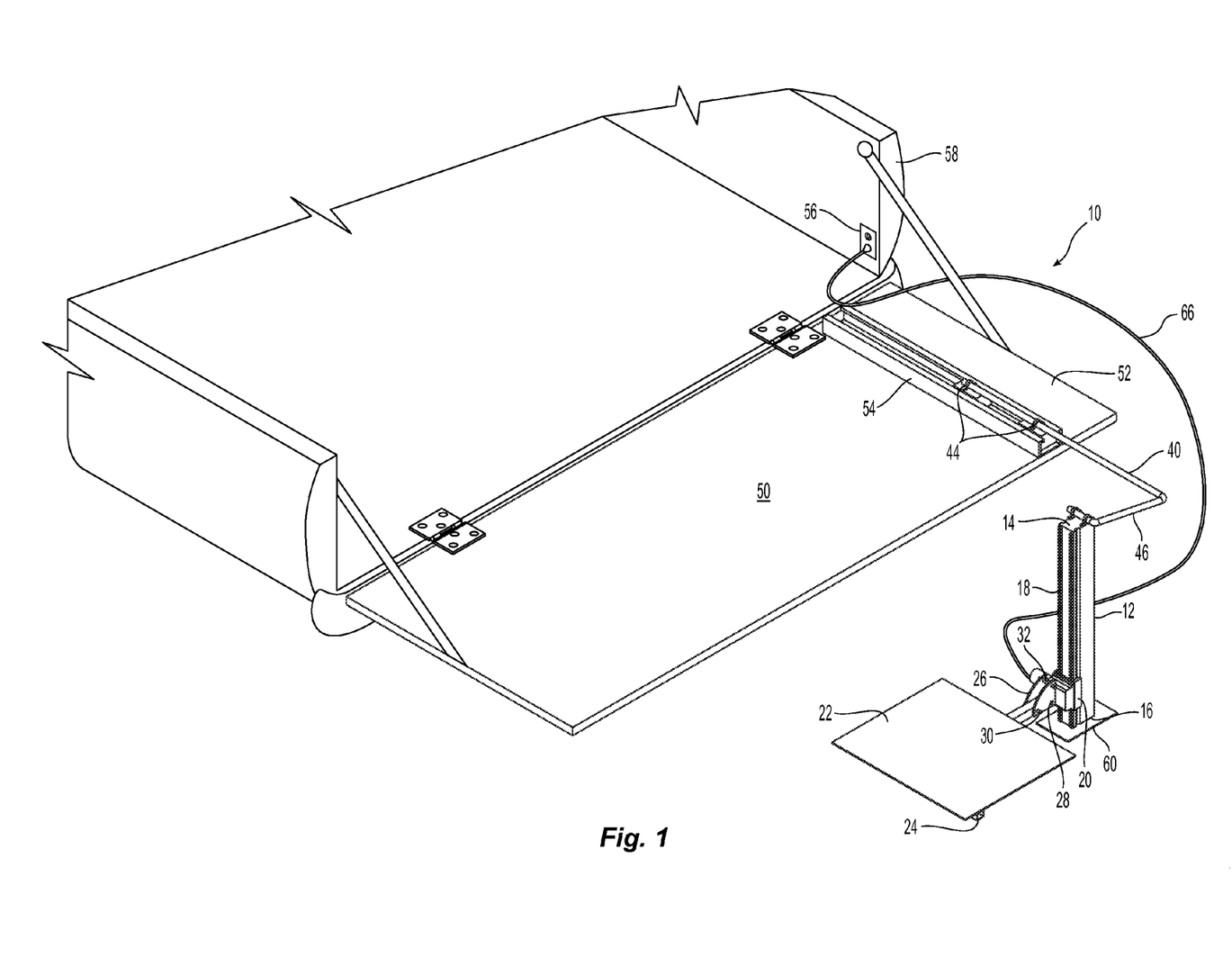
FIG. 1 is a perspective view of one embodiment of a portable and foldable lift according to the present invention attached to the tailgate of a truck.
Figure 2:
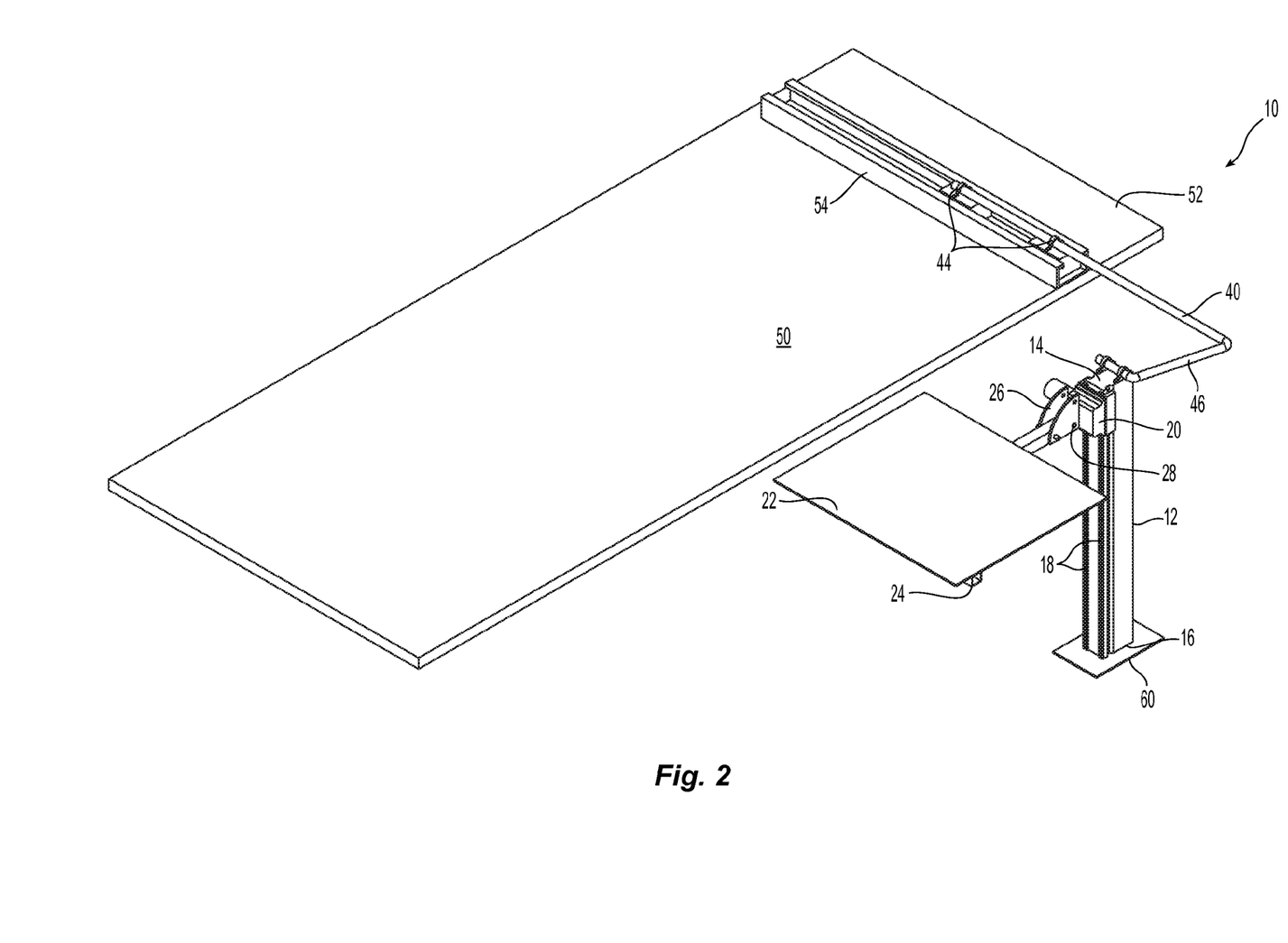
FIG. 2 is a perspective view of the portable and foldable lift of FIG. 1 in an up position.
Figure 4:
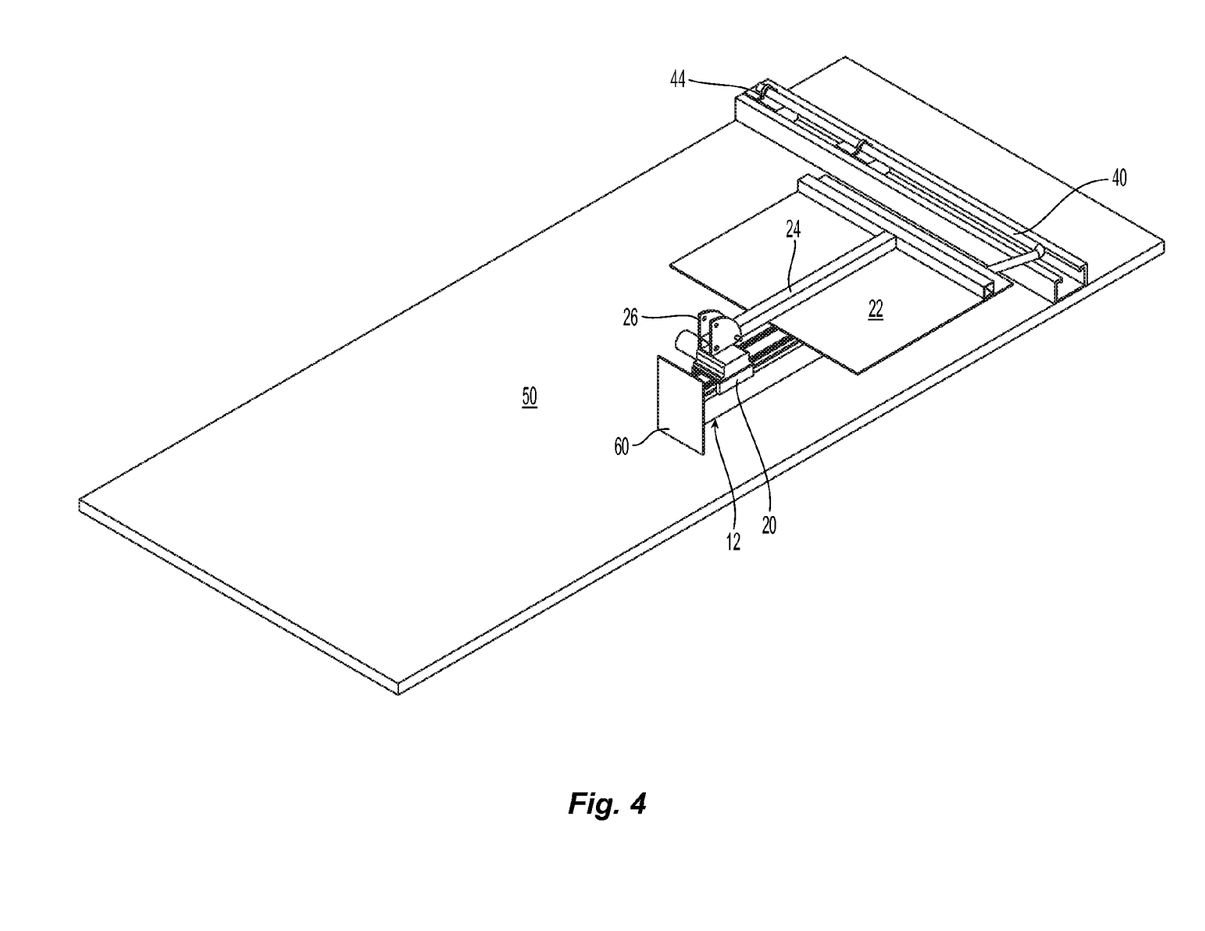
FIG. 4 is a perspective view of the portable and foldable lift of FIG. 1 in a folded position being stored.
Figure 6:
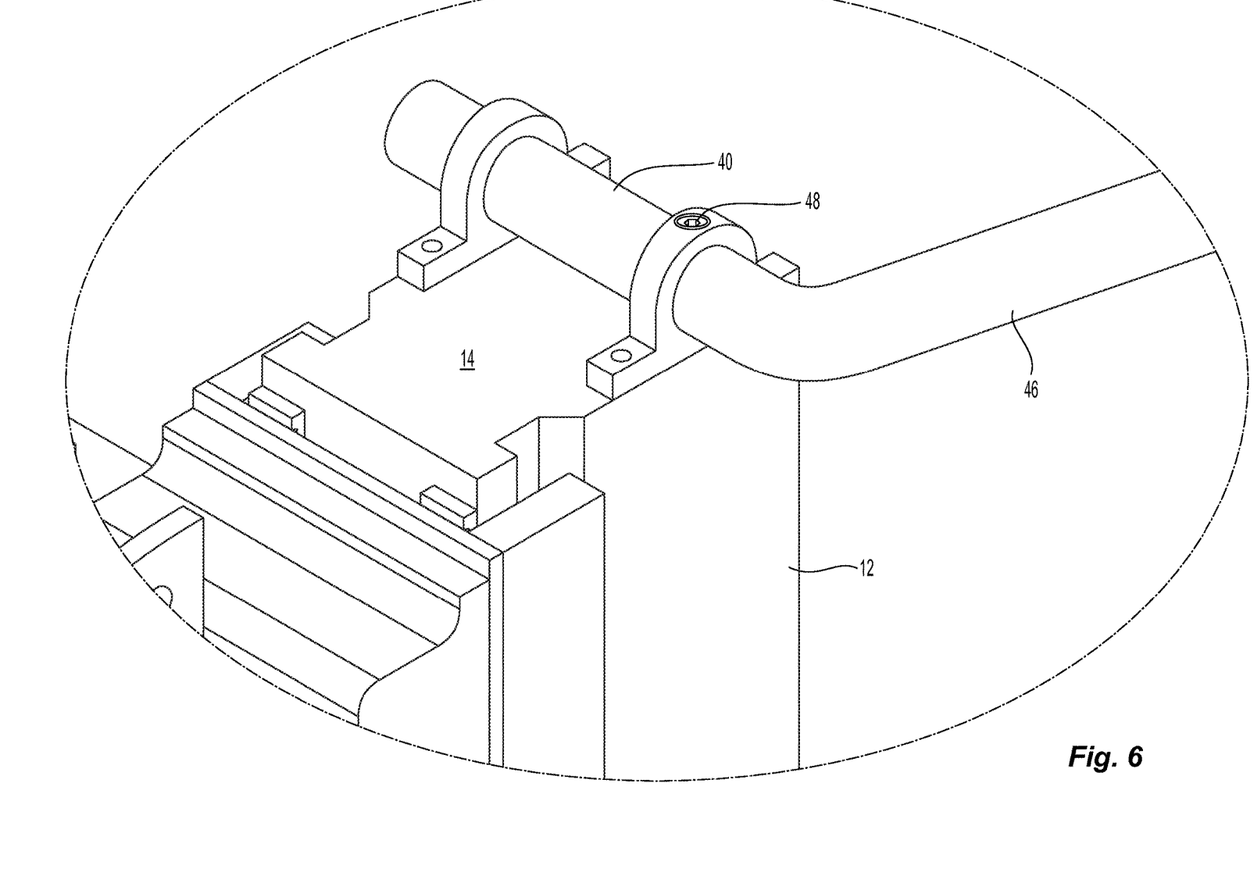
FIG. 6 is a detailed view of a set screw used to fix the glide member to the top of the lift member.

Attached at or near the top of the support member 12 is a glide member 40. The glide member 40 allows the portable and foldable lift 10 to moved be along the surface 50 of a tailgate, workbench, van door, or other secure structure 52 but still remain secured thereto. One example of a secure structure 52 is illustrated in FIG. 1 as a tailgate 52, attached to a truck 58, a portion of which is illustrated therein. The secure structure 52 in each of the other figures is illustrated as a more generic representation of a structure and could be a tailgate, a work bench, van door, etc. The glide member 40 is rotatably attached to the support member 12 (see FIGS. 4 & 6) and can be secured relative to the support member 12 by a fastener 48, such as a set screw, thumb screw, or other appropriate screw or fastener. See FIG. 6. The glide member 40 is slidably and rotatably attached to the attachment member 54, which is fixedly attached to the surface 50 of a tailgate, workbench or other secure structure 52. The attachment member 54, as illustrated, is a generally c-shaped channel 42 with sliding elements 44 sliding within the channel 42 and are attached to the glide member 40. Other configurations of the attachment member 54 may be used and still fall within the scope of the present invention. This allows the portable and foldable lift 10 to be slid out and off of the surface 50 of a tailgate, workbench or other secure structure 52, and rotated downward to be disposed in the operating position, as illustrated in FIG. 1. The stowed version of the portable and foldable lift 10 is illustrated in FIG. 4.

The support element 12 preferably has at the bottom end 16 a base 60 to provide stability and support for the support element 12, particularly when the portable and foldable lift 10 is used on soft, rocky, uneven, or sandy ground. The base 60 may also have wheels 62, as illustrated in the embodiment in FIG. 8. While several wheels 62 are illustrated, there may be fewer (even none as illustrated in the other figures) or be of a different type, size, or in a different location (under, on the side of, etc., the base 60) and still fall within the scope of the present invention.

Figure 5:
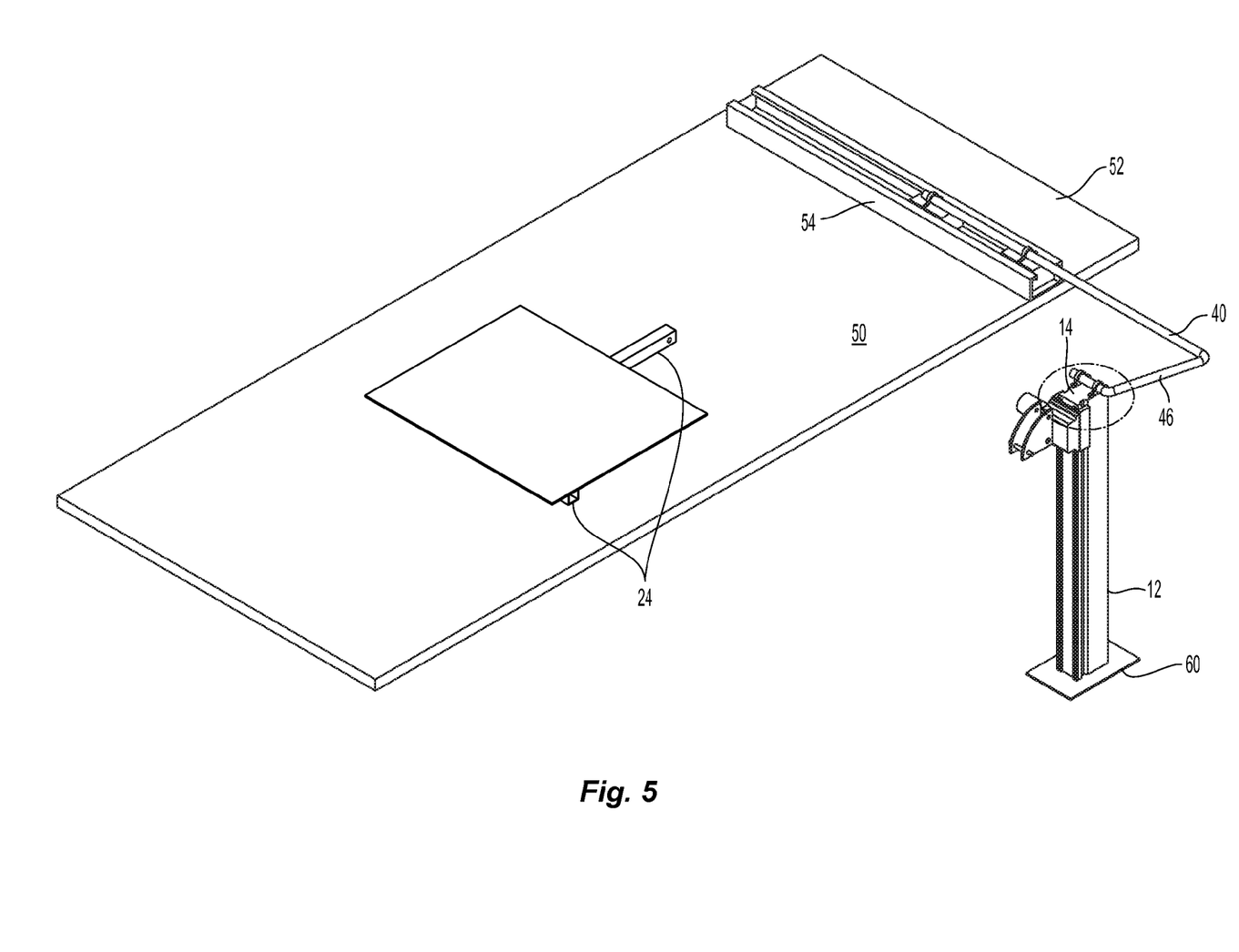
FIG. 5 illustrates that a removable support plate that can be used with the portable and foldable lift of FIG. 1.

As illustrated in FIG. 5, the support plate 22 and/or support rib 24 can be removed from the connector 26 by removing the pin 28, allowing the support plate 22 and support rib 24 to be stored with the portable and foldable lift 10 or separately therefrom. Also, removing the support plate 22 and/or support rib 24 makes the portable and foldable lift 10 lighter and easier for the user to lift up and store on the surface 50.

Figure 7:
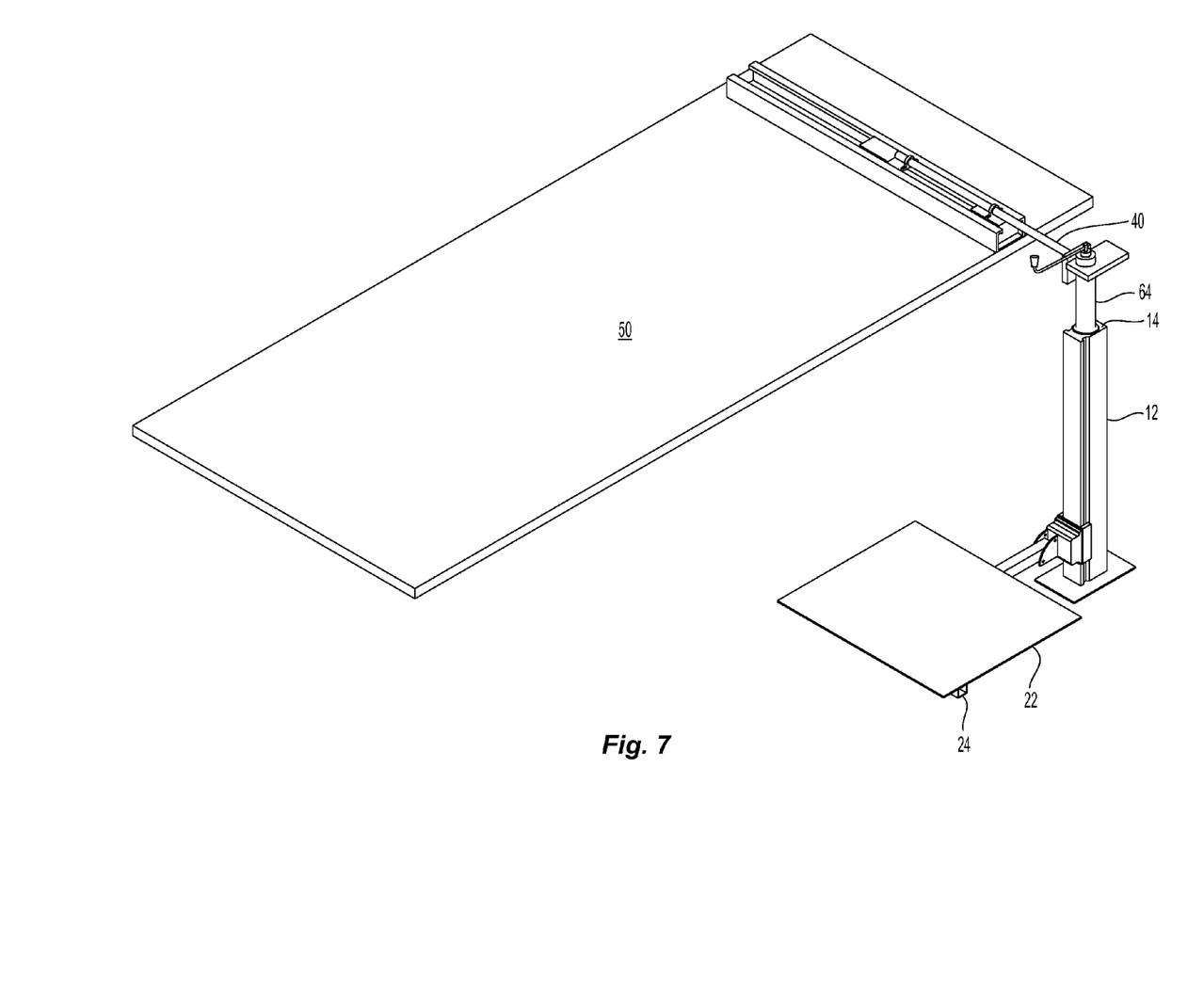
FIG. 7 is a perspective view of a height adjustment member attached to a top end of the lift of FIG. 1.

It should be noted that, as illustrated in FIG. 7, a height adjustment member 64 can be attached to the support element 12, thereby allowing a single support element 12 to be used across different situations and distances between the ground and the surface 50. As illustrated in FIG. 7, the height adjustment member 64 is illustrated as a jack attached to the top end 14 of the support member 12 and also to the glide member 40. The height adjustment member 64, which is illustrated as a hand crank jack, but could be any type of jack, allows the user to correct for any additional distance between the ground and the glide member to ensure proper alignment and support of the portable and foldable lift 10 while allowing the support plate 22 to reach surface 50. While the glide member 40 has some ability to compensate for distance differences with the extension 46 and positioning the support member 12 relative to the attachment member 40, the difference may be greater than the length of the extension 46. Thus, the height adjustment member 54 provides for additional distance compensation.

The lifting member 20 of the portable and foldable lift 10 is preferably an electric motor that can be powered in a number of manners. The lifting member 20 of the portable and foldable lift 10 can be outfitted to have an electrical cord 66 that can be plugged into a wiring receptacle 56 at the rear of the truck (i.e., near the hitch or even one that is installed for this purpose alone). See FIG. 1. The lifting member 20 of the portable and foldable lift 10 preferably operates on 18V, although any appropriate voltage may be used depending on the load expected to be carried and the motor used, so it can be powered through the cord or even by attaching it to an 18V battery, such as those used with rechargeable power tools. Similarly, the power supply could be AC rather than the DC power mentioned above.

Figure 8:
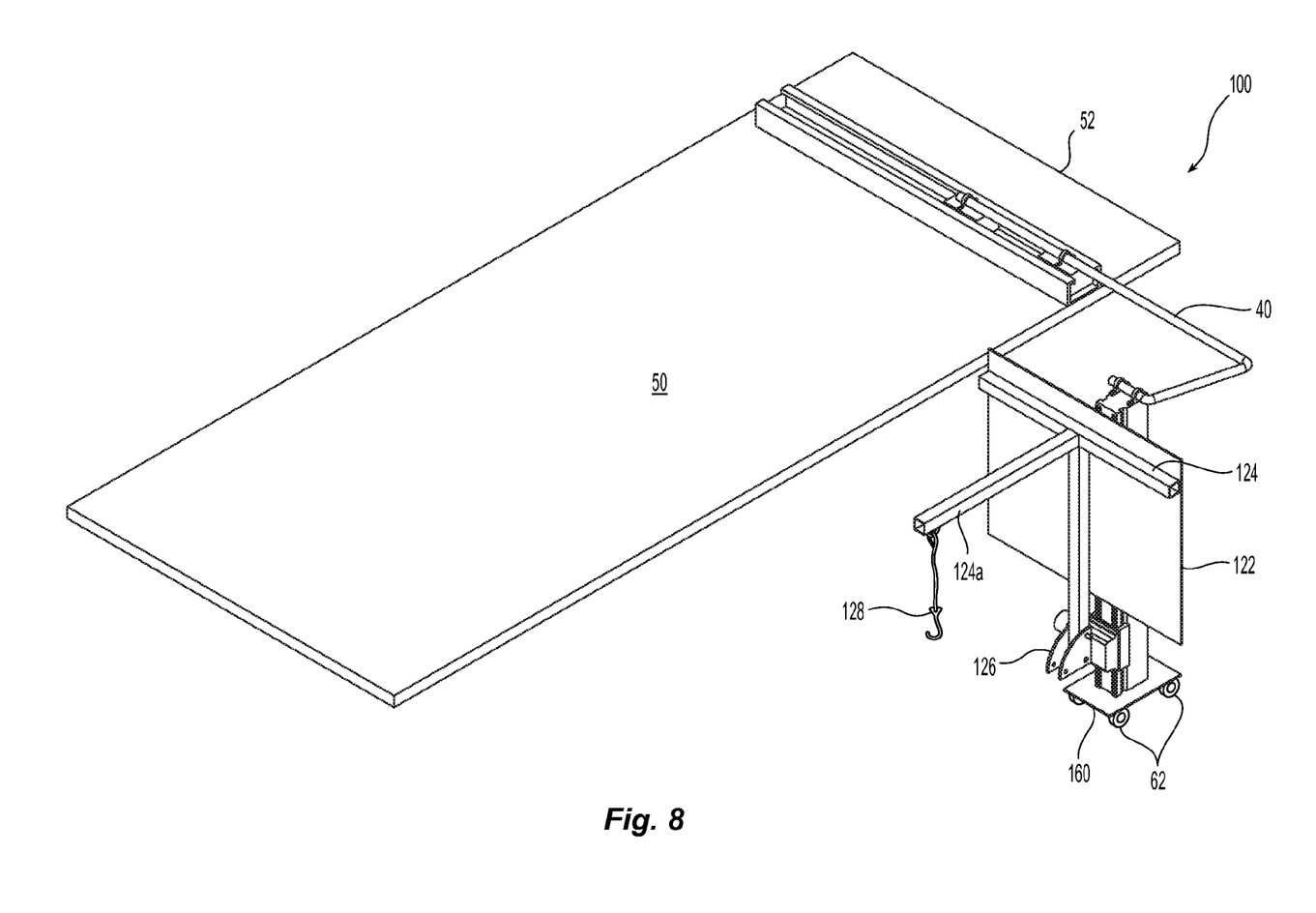
FIG. 8 is a perspective view of another embodiment of a portable and foldable lift according to the present invention.

FIG. 8 illustrates another embodiment of a portable and foldable lift 100 according to the present invention. In the portable and foldable lift 100, the support rib 124 also has an extension 124a. The extension 124a extends outward away from the support plate 122 and has a hook 128 to attach to items that may be or are better suited to be lifted by a hook than to sit on the support plate 122. This configuration also allows for the object being lifted to be lifted higher relative to the surface 50 than if it were simply on the support plate 122. The extension 124a could be attached to the connector 126 by support rib 124 without the support plate 122. Alternatively, the hook 128 could also be attached to the support plate 122 and not the support rib 124 or the extension 124a. As noted above, the base plate 160 may also have wheels 62.

Figure 9:
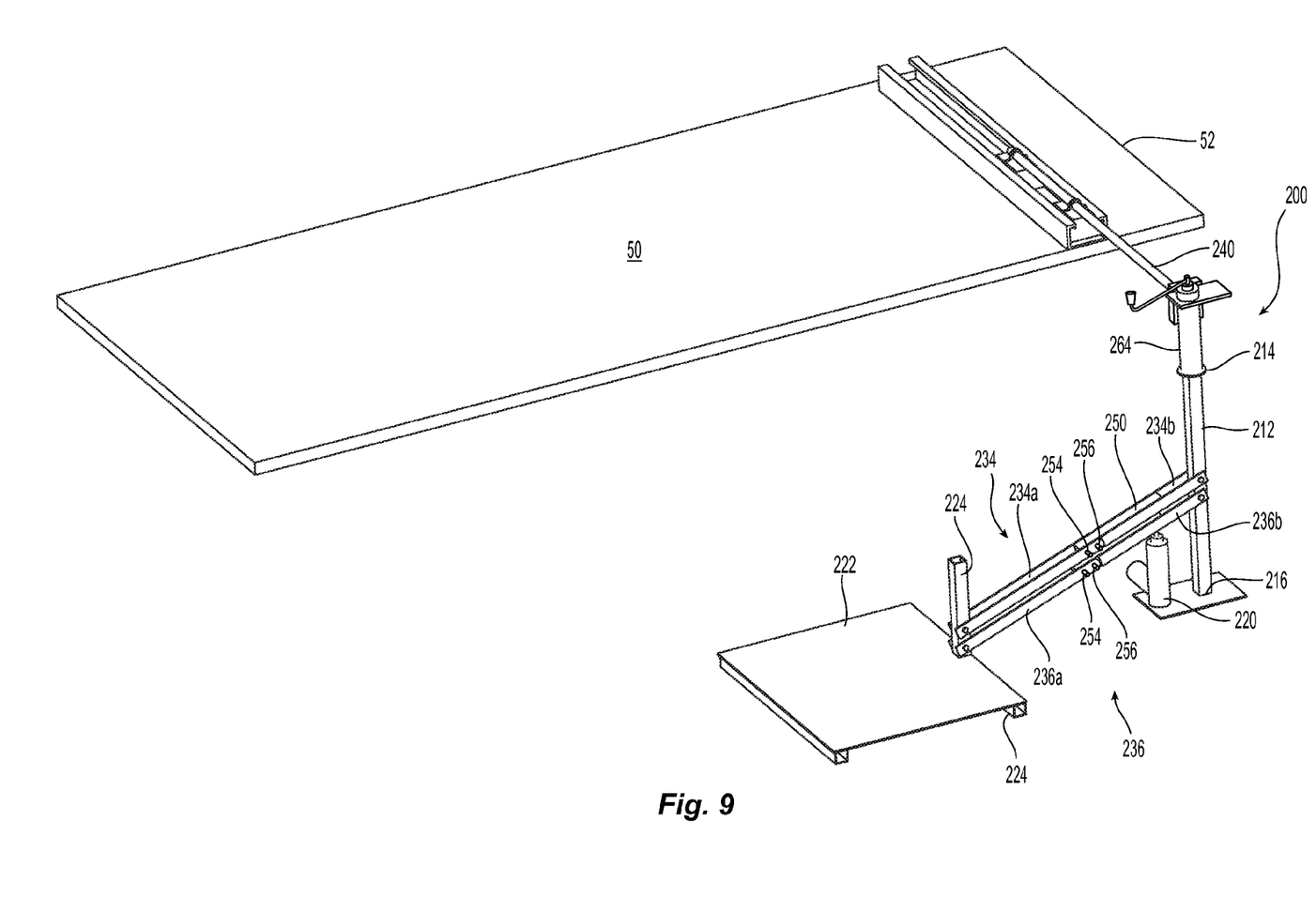
FIG. 9 is a perspective view of another embodiment of a portable and foldable lift according to the present invention in a first position.
Figure 10:
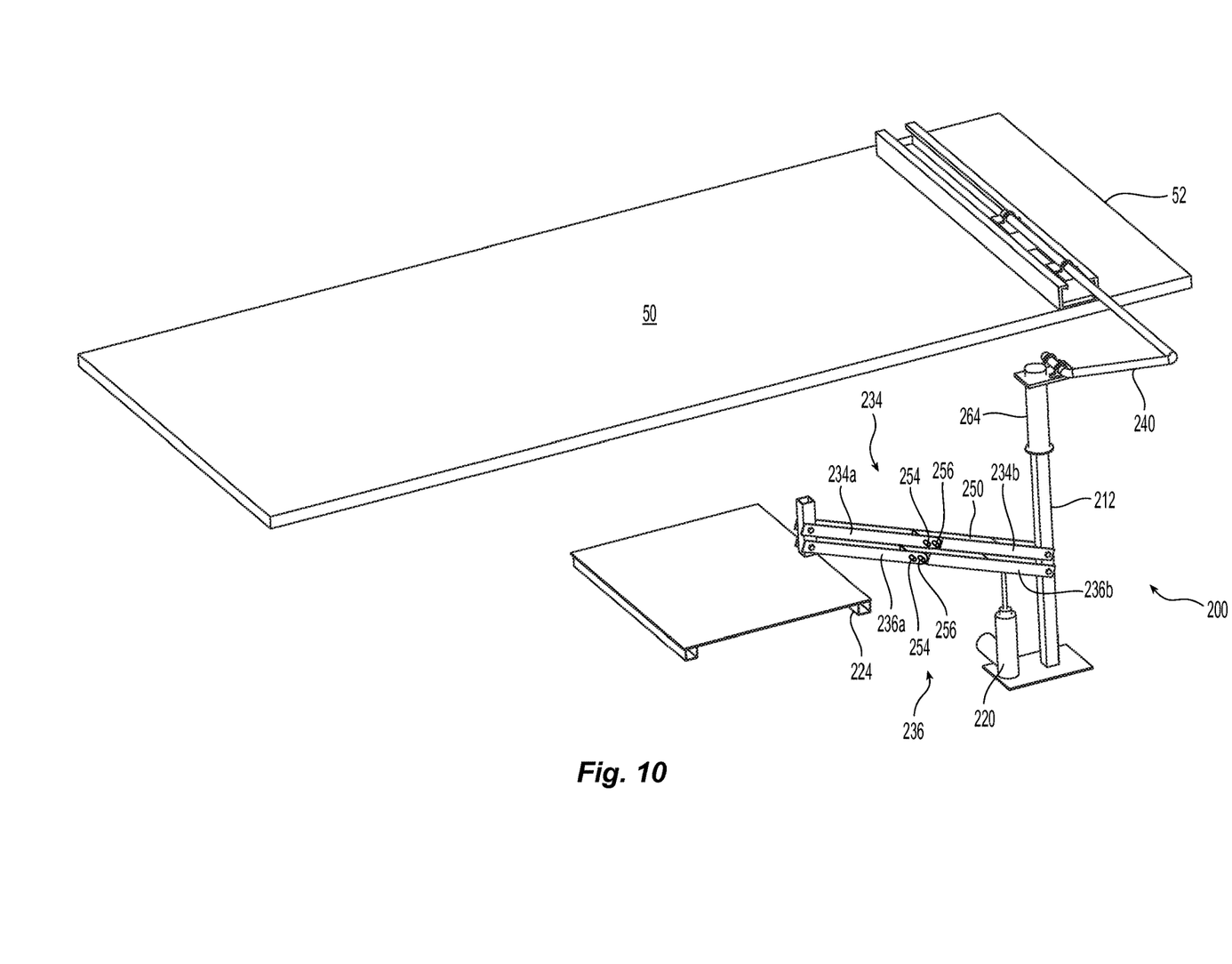
FIG. 10 is a perspective view of the portable and foldable lift of FIG. 9 moving in an up position toward a structure.

FIG. 9 illustrates another embodiment of a portable and foldable lift 200. The portable and foldable lift 200 has a support member 212 with a top end 214 and a bottom end 216. The support member 212 is preferably made from a hard, rigid material, such as aluminum, but could be made of any appropriate material, including, for example, stainless steel, steel, structural plastics (e.g., polyethylene), carbon fiber, and titanium. Aluminum, being less dense than steel, is better suited to the purposes of the invention. Attached to the support member 212 are two sets of arms 234,236 in space relation to each other. The two sets arms 234,236 are rotatably attached to the both the support member 212 and the support plate 222. A jack 220 is attached to at least one of the arms 234,236. As the jack 220 is raised (can done with a hand crank or a foot crank), the arms 234,236 are raised, which in turn raises the support plate 222. The jack 220 may also have an actuator to avoid the user from having to operate the jack 220 by hand. Since the two arms 234,236 are rotatably connected to the support plate 222, the support plate 222 is raised in and remains in a horizontal position as shown in FIGS. 9 and 10. The support plate 222 is preferably attached to the arms 234,236 in a removable fashion to allow for easier and more compact storage. The arms 234,236 are also collapsible for easy storage. While the arms 234,236 can be collapsible in a number of ways, one way is illustrated in FIGS. 9 and 10 by a joining member 250 being positioned between each of the two set of arms 234,236. A joining member 250 is attached between each of the sets of arms 234b and 236b and each extends toward a respective one of the two sets of arms 234a,236a. The two sets of arms 234a,236a are then attached to a respective joining member 250 by two pins 254, 256. The pin 254 is removed from the two sets of arms 234a,236a and the joining member 250 to collapse the lift 200, and the two sets of arms 234a,236a rotate about the pin 256. The allows the two sets of arms 234,236 to be folded up against the support member 212. Additionally, while the joining member 250 is close to the center of each of the arms 234,236, a joining member 250 can be placed anywhere along the length of the arms 234,236 and still fall within the scope of the present invention. As with the other embodiments, the support plate 222 has sufficient rigidity to keep the objects thereon. The support plate 222 can be made out of any appropriate materials, including, for example, stainless steel, steel, structural plastics (e.g., polyethylene), carbon fiber, and titanium. The support plate 222 may also have support rib 224. Alternatively, the support plate 222 may be made strong and of a sufficient thickness to attach directly to the arms 234,236 without the need for additional support.

The portable and foldable lift 200 also has a glide member 240. The glide member 240 allows the portable and foldable lift 200 to moved be along the surface 50 of a tailgate, workbench or other secure structure 52. See FIGS. 1 and 11. The glide member 240 is rotatably attached to the support member 212 and can be secured relative to the support member 212 by a set screw, thumb screw, or other appropriate screw or fastener as illustrated above in FIG. 6. The portable and foldable lift 200 may also have a height adjustment member 264 attached thereto. As illustrated, the height adjustment member 264 is attached to the top end 214 of the portable and foldable lift 200. The glide member 240 is slidably and rotatably attached to the attachment member 54, which is fixedly attached to the surface 50 of a tailgate, workbench or other secure structure 52. The attachment member 240, as illustrated, is a generally c-shaped channel 242 with sliding elements 244 sliding within the channel 242 and are attached to the glide member 240. This allows the portable and foldable lift 200 to be slid out off of the surface 50 of a tailgate, workbench or other secure structure 52 and rotated downward to be disposed in the operating position, as illustrated in FIG. 8.

Figure 11:
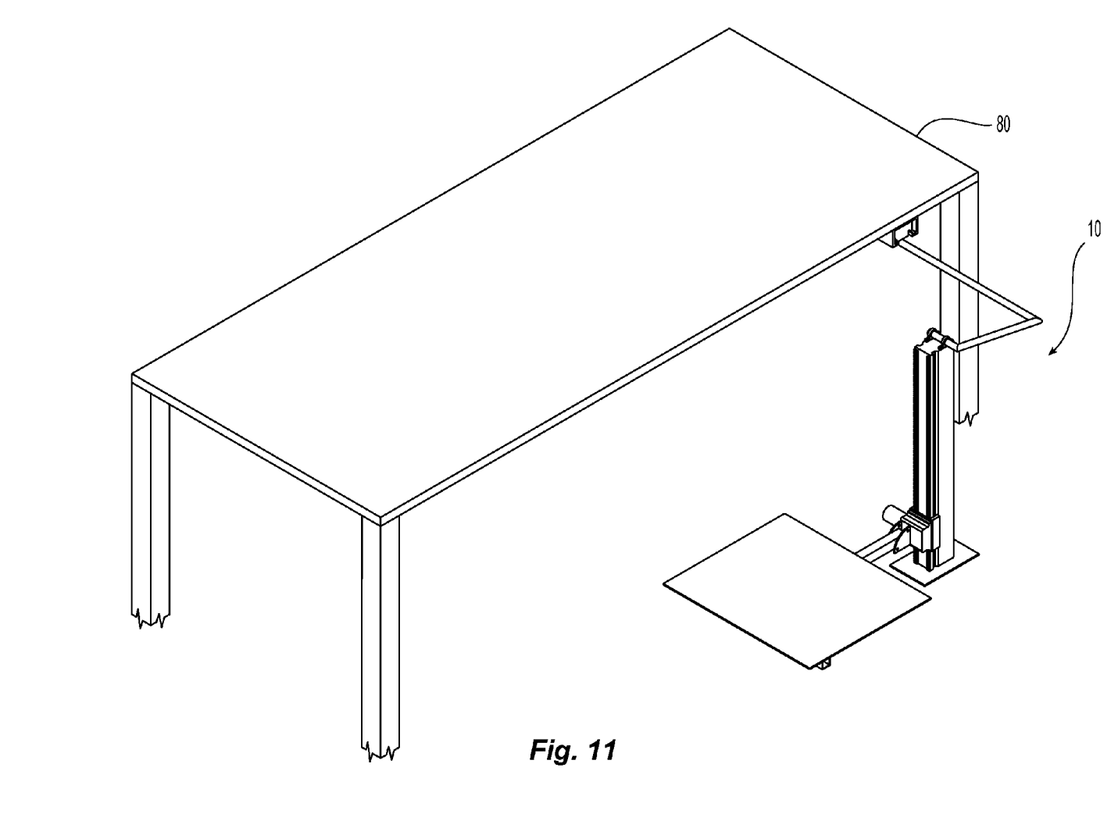
FIG. 11 is perspective view of another embodiment of a portable and foldable lift attached to the underside of a work bench.

FIG. 11 illustrates the portable and foldable lift 10 attached to the underside of a workbench 80. Rather than resting on top of the bench 80, it can be secured up under the bench 80 to keep it out of the way.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

I claim:

1. A portable and foldable lift that is attachable to a structure, the portable lift comprising:
   a single support member, the support member extending between a top end and a bottom end;
   a lifting member;
   a support plate, the support plate operatively connected to the lifting member, the lifting member and the support plate moving together and relative to the support member between the top end and the bottom end; and
   a glide member rotatably connected to the support member and slidably and rotatably connected to an attachment member fixedly attached to a surface of the structure.

2. The portable lift according to claim 1, further comprising a base attached to the support member at the bottom end thereto.

3. The portable lift according to claim 2, wherein the base has at least one wheel attached thereto.

4. The portable lift according to claim 1, further comprising a height adjustment member attached to the support member to adjust the height of the support member relative to the surface.

5. The portable lift according to claim 4, wherein the height adjustment member is attached to the top end of the support member.

6. The portable lift according to claim 1, wherein the support plate is removably attached to the lifting member.

7. The portable lift according to claim 1, wherein the attachment member is attached to a tailgate of a truck.

8. The portable lift according to claim 1, wherein the attachment member is connected to a work bench.

9. The portable lift according to claim 1, wherein the lifting member is an electric motor attached to a gear and the support member has teeth along at least a portion thereof to engage the gear.

10. A portable and foldable lift that is attachable to a structure, the portable lift comprising:
    a support member, the support member extending between a top end and a bottom end;
    a lifting member;
    a support plate, the support plate operatively connected to the lifting member, the lifting member moving the support plate relative to the support member;
    a glide member operatively connected to the support member and slidably connected to a surface by an attachment member;
    a base attached to the support member at the bottom end thereof; and
    a height adjustment member is attached to the support member to adjust the height of the support member relative to the surface.

11. The portable lift according to claim 10, wherein the attachment member is attached to a tailgate of a truck.

12. The portable lift according to claim 10, wherein the attachment member is connected to a work bench.

13. The portable lift according to claim 10, further comprising a base attached to the support member at the bottom end thereto.

14. The portable lift according to claim 10, wherein the glide member is rotatably and slidingly connected to the attachment member.

15. A portable and foldable lift that is attachable to a surface of a tail gate of a truck, the portable lift comprising:
- a single support member, the support member extending between a top end and a bottom end;
- a lifting member;
- a support plate, the support plate operatively connected to the lifting member, the lifting member and the support plate moving together and relative to the support member between the top end and the bottom end; and
- a glide member rotatably connected to the support member and slidably connected to the surface of tail gate of a truck by an attachment member directly attached to the surface of the tail gate.

16. The portable lift according to claim 15, wherein the attachment member is connected to a work bench.

17. The portable lift according to claim 15, further comprising a base attached to the support member at the bottom end thereto.

18. The portable lift according to claim 15, wherein the glide member is rotatably and slidingly connected to the attachment member.

\* \* \* \* \*